United States Patent
Huss et al.

[11] 4,313,824
[45] Feb. 2, 1982

[54] WASTE WATER TREATMENT SYSTEM AND PROCESS

[75] Inventors: Christina L. Huss; Jon K. West, both of Gainesville, Fla.

[73] Assignee: General Electric Company, Gainesville, Fla.

[21] Appl. No.: 200,349

[22] Filed: Nov. 24, 1980

[51] Int. Cl.³ .............................................. C02C 5/00
[52] U.S. Cl. ................................... 210/86; 210/104; 210/114; 210/170; 210/919
[58] Field of Search ................. 210/86, 104, 114, 170, 210/919, 195.1, 198, 805

[56] References Cited

U.S. PATENT DOCUMENTS

| | | | |
|---|---|---|---|
| 3,592,743 | 10/1979 | Freshcorn | 210/919 |
| 3,850,807 | 11/1974 | Jones | 210/919 |
| 4,031,007 | 6/1977 | Sierra, Jr. | 210/104 |
| 4,165,289 | 8/1979 | Borst | 210/919 |
| 4,246,112 | 1/1981 | Mausgrover | 210/104 |

*Primary Examiner*—John Adee
*Attorney, Agent, or Firm*—Pollock, Vande Sande & Priddy

[57] ABSTRACT

An improved process and a system for waste water treatment are disclosed which are particularly suited for use in industrial plants (10) having existing drainage trench networks (108-128) through which normal plant effluents, component leakage and accidental spills ordinarily would be allowed to flow. The trench system is connected to a waste water treatment facility (FIG. 1) designed to remove impurities from the effluents and return acceptably clean water to the plant for reuse or discharge it to the environment. Because some plant effluents, component leaks and unexpected spillages can increase the concentration of impurities in the waste water to levels beyond the design limits of the waste water treatment system, a series of dams (138-144, 150-154, 162-176) are provided at locations throughout the trench network so that effluents having rather high ranges of concentration of impurities are held behind the dams. Effluents having relatively low ranges of concentration are directed into isolated trenches (108) or a pipe network (178, 180) located in the trenches, the pipes then being led through sealed apertures in the dams to discharge to the waste water treatment system. The highly concentrated effluents are periodically pumped (148, 192) from behind the dams and discharged to a portion (76-106) of the waste water treatment system in which their impurities are concentrated for disposal in solid form.

4 Claims, 5 Drawing Figures

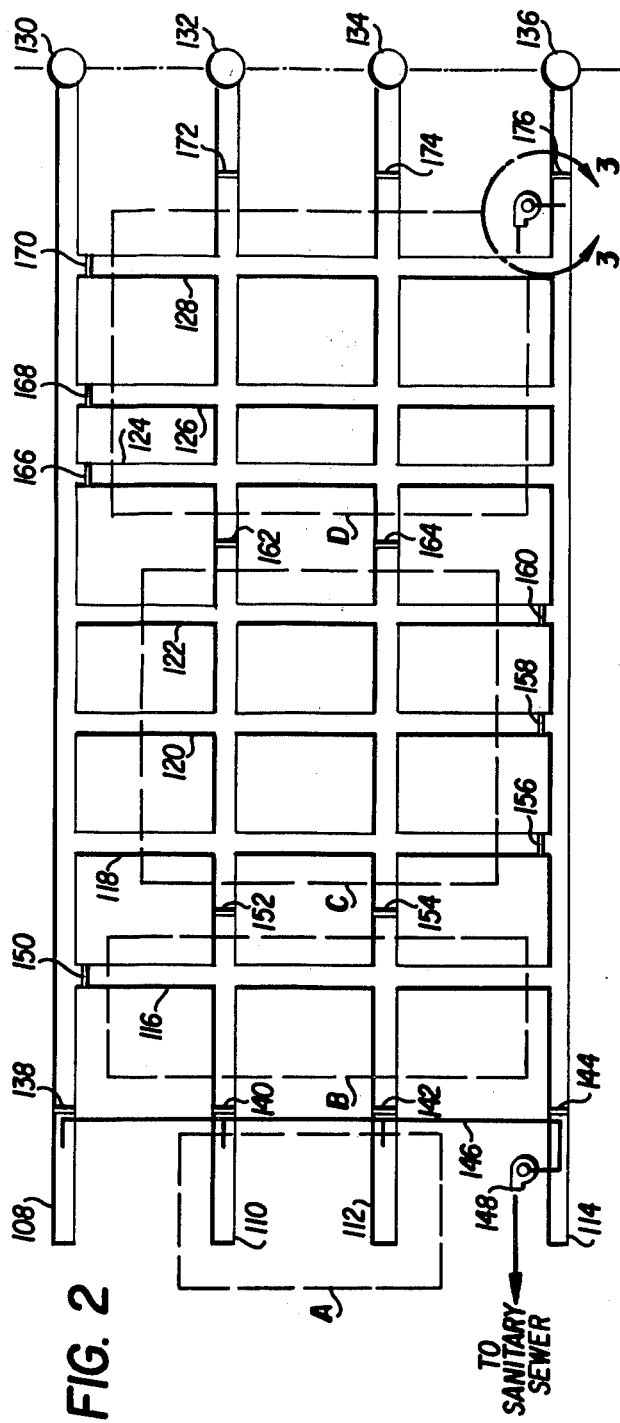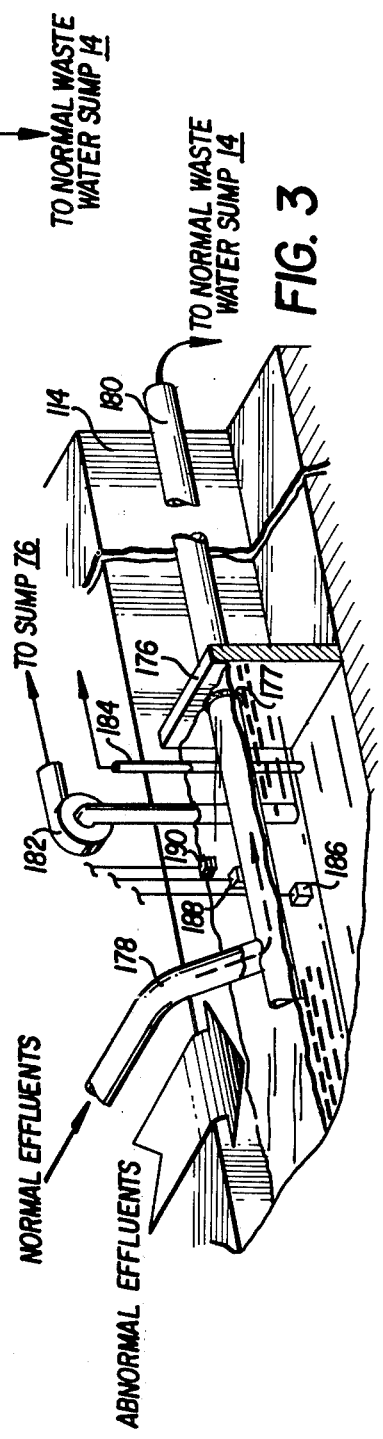
FIG. 2
FIG. 3

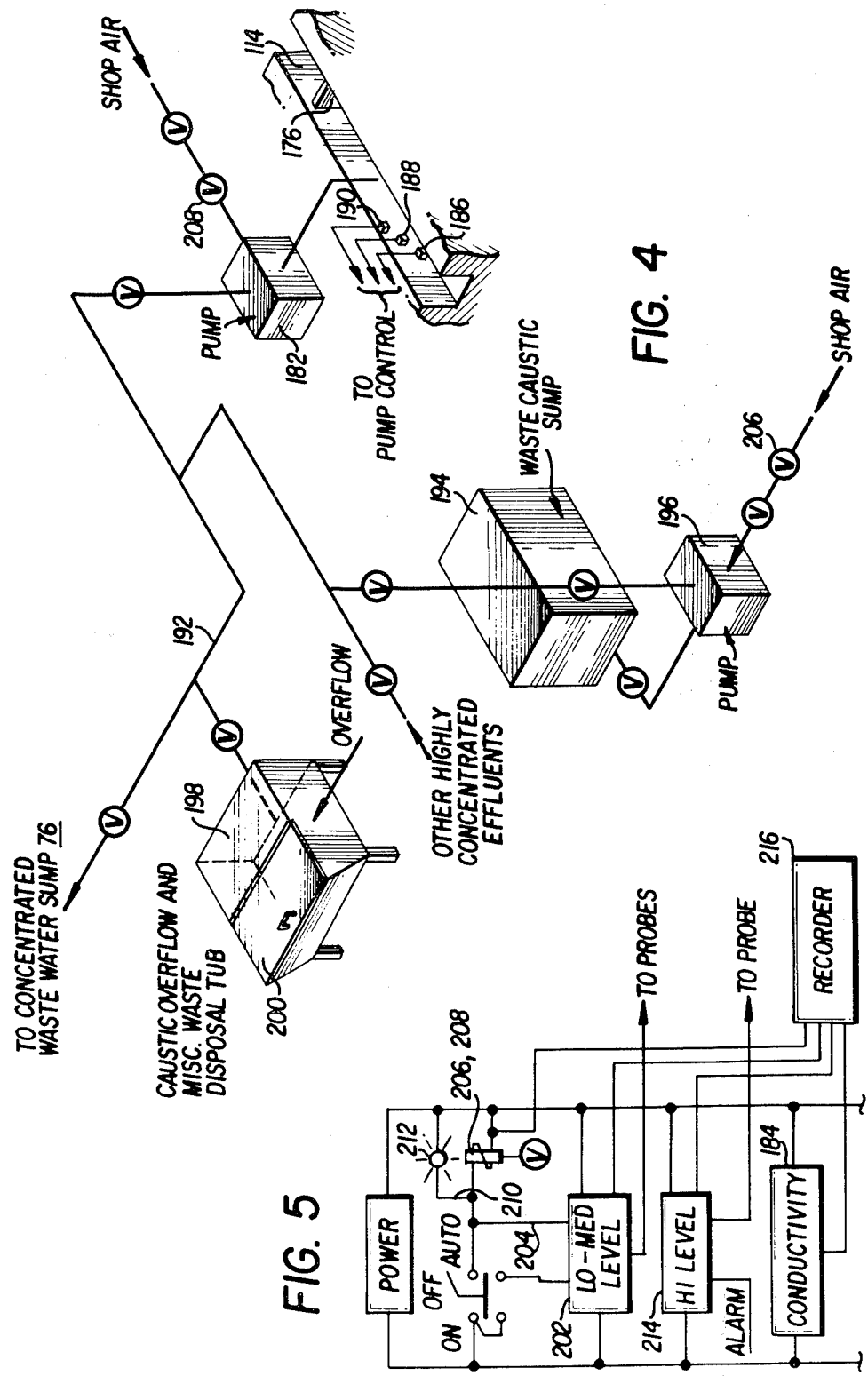

WASTE WATER TREATMENT SYSTEM AND PROCESS

TECHNICAL FIELD

The present invention concerns systems and processes for treating waste water from industrial plants. More particularly, the invention concerns a waste water treatment system and process for use in an industrial plant of the type having an existing drainage trench system which is modified in accordance with the invention so that effluents of relatively low and high concentrations of impurities are segregated for separate treatment.

BACKGROUND ART

In recent years, industries of all types have been confronted with problems concerning both elimination of impurities in waste water returned to the environment and reduction of the total volume of water required for plant operation. Progressively more stringent anti-pollution regulations have led to the development of more sophisticated systems for treating and cleaning effluents. An example of such a sophisticated system is disclosed in copending, commonly assigned application Ser. No. 191,191 filed Sept. 26, 1980, and entitled Treatment of Waste Water, the contents of which are hereby incorporated by reference in the present application.

In some instances, due to financial constraints, the relatively high concentration of impurities in the effluents to be treated and the sheer volume of the effluents, the waste water treatment system may have to operate at close to its design limitations much of the time. The result of this type of operation can be that relatively small amounts of effluents having very high concentrations of impurities may cause the system to become overloaded. The result may then be that neither the water returned to the plant nor that discharged to the environment can be maintained within the specifications required for plant operation and those mandated by anti-pollution regulations. In a typical industrial plant, such highly concentrated effluents may result from leakage of various plant components, notably pump seals, spillage of highly concentrated reagents and other process liquids due to operator errors, and the like. In such situations, it becomes necessary to devise a technique or process for segregating the highly concentrated effluents from other effluents, so that the waste water treatment system can function properly.

DISCLOSURE OF THE INVENTION

A primary object of the present invention is to provide a waste water treatment system and process particularly suited for use in an industrial plant of the type having a pre-existing drainage trench system through which plant effluents flow.

Another object of the invention is to provide such a system in which the existing trench network is modified by the addition of a number of dams which divide the network into trenches for effluents of relatively low concentration and trenches for effluents of relatively high concentration.

Yet another object of the invention is to provide such a system in which the low and high concentration effluents are treated separately within the same waste water treatment system so that both operational and environmental standards are maintained.

These objects of the invention are given only by way of example; thus, other desirable objectives or advantages inherently achieved by the disclosed invention may occur or become apparent to those skilled in the art. Nonetheless, the scope of the invention is to be limited only by the appended claims.

The invention is especially suited for use in an industrial plant of the type having a first class of liquid effluents with impurities in anticipated, relatively low ranges of concentration; and a second class of waste liquid effluents, caused at least in part by leakage or spillage in the plant, with impurities in significantly higher ranges of concentration. The invention is especially suited for application to such a plant which has an existing network of drainage trenches for removing effluents from the plant. At least one liquid dam is provided in the trench network to stop flow of the second class effluents from the plant and conduits or isolated trenches are provided for receiving the flow of at least a portion of the first class effluents and directing this flow past the liquid dam to a waste water treatment system. Pumps are provided for periodically removing highly concentrated effluents from behind the dam and directing them to a portion of the waste water treatment system in which their impurities are concentrated for disposal.

In a preferred embodiment, the conduits for the first class of effluents are routed through the trenches, and, where necessary, pass through sealed apertures in the dams. Those skilled in the art will appreciate that it is also within the scope of the invention to provide in a newly constructed industrial plant separate drainage trench networks for waste liquid effluents of the first and second classes, thereby eliminating the need for liquid dams.

In the process according to the invention, a waste water treatment system of the type disclosed in the previously mentioned copending patent application is used, so that the low concentration effluents are passed through a cleaning system which comprises demineralizing and deionizing means for removing their impurities. The resulting, relatively clean water is then returned to the plant for reuse. Periodically, the demineralizing and deionizing means are back flushed into a further system in which the impurities in the backflush liquid are concentrated for disposal in solid form. The high concentration effluents from the plant are passed directly to this further cleaning system. Of course, other types of waste water treatment systems may be used in accordance with the present invention, the distinguishing feature of the invention being that the effluents having relatively low concentrations of impurities are treated to provide relatively clean water for reuse; whereas, the effluents having relatively high concentrations of impurities are separately treated.

Another aspect of the present invention concerns apparatus for controlling the periodic removal of highly concentrated effluents from behind the various dams placed in the drainage trench network. Particularly, each dam is provided with means for detecting low and intermediate liquid levels behind the dam and means responsive to this detection means for pumping the highly concentrated effluents from behind the dam when the liquid level is between the low and intermediate levels. A further liquid level detector is also provided behind the dam at a still higher level and means are provided for actuating an alarm in response to this further level detector, to indicate a malfunction of the pump. A further feature of the invention is the provision at each dam of means for measuring and displaying the conductivity of the highly concentrated effluents to facilitate early detection of plant malfunctions such as large reagent spills and the like.

BRIEF DESCRIPTION OF THE DRAWINGS

FIG. 2 shows a schematic diagram of a drainage trench system for an industrial plant, the trench system having been modified in accordance with the present invention.

FIG. 3 shows an enlarged detail of the encircled portion of the system shown in FIG. 2.

FIG. 4 shows a schematic representation of a portion of the system according to the invention through which highly concentrated effluents are conveyed.

FIG. 5 shows a schematic diagram of the electrical controller which operates the pumps for the highly concentrated effluents.

BEST MODE FOR CARRYING OUT THE INVENTION

Figure 1:
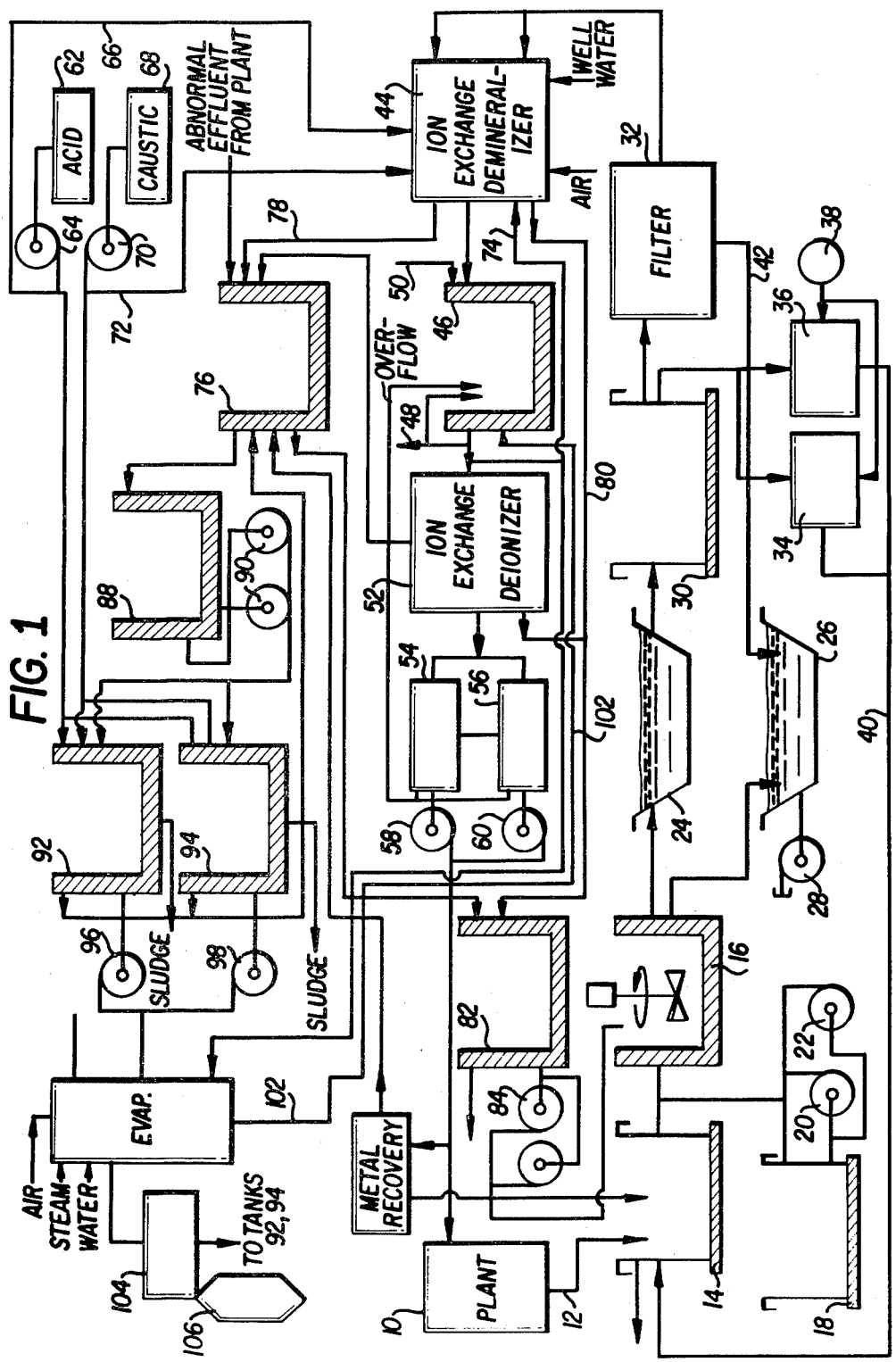
FIG. 1 shows a schematic representation of a waste water treatment system of the type particularly suited for use with the present invention.

The following is a detailed description of a preferred embodiment of the invention, reference being made to drawings in which like reference numerals identify like elements of structure in each of the several figures.

Referring now to FIG. 1, an industrial plant 10 is shown which discharges its normal, low concentration effluents through a conduit 12 which passes the effluents into a large concrete sump 14. From sump 14, the effluents are passed to a mixing tank 16 in which various chemical adjustments may be made. For example, the pH of the effluents may be adjusted by adding liquid caustic from a storage tank 18 by means of pumps 20, 22. Following such chemical adjustment, depending upon the flow rate of the effluents and their pH, the effluent is directed to either settling pond 24 or overflow settling pond 26. Liquid retained in overflow pond 26 is subsequently removed for treatment by means of a pump 28. The clarified liquid leaving settling pond 24 passes into a clear well or tank 30 from which it is removed by appropriate pumps (not shown) to pass through a filter 32 which removes solid waste. A portion of the liquid leaving clear well 30 is also directed to the plant air scrubbers 34, 36 which are used to remove small percentages of contaminants from the air discharged from the plant. Additional water may also be directed to scrubbers 34, 36 from a well 38 or other water supply. The effluent from scrubbers 34, 36 is then directed to sump 14 via conduit 40.

Periodically, filter 32 is backflushed and the waste material is discharged to overflow settling pond 26 through a conduit 42. Waste liquid which has passed through filter 32 is directed to an ion exchange demineralizer 44 and from there into an air gap demineralizer tank 46. While the partially cleaned liquid resides in tank 46, the system flow balance may be adjusted. If the liquid level in ponds 24, 26 is relatively high, the liquid held in tank 46 may be discharged directly to the environment via a conduit 48. If the levels in ponds 24, 26 are relatively low, it may be necessary to add water from well 38 via conduit 50. On the other hand, if the levels in ponds 24, 26 are sufficiently high to allow return of clean water to plant 10, then the contents of tank 46 are passed to an ion exchange deionizer 52 which discharges to a pair of storage tanks 54, 56 from which acceptably clean water is returned to plant 10 for reuse by means of pumps 58, 60. The specific type of filter 32, demineralizer 44 and deionizer 52 will depend upon the chemical composition of the effluents from plant 10. One set of components is disclosed in the previously-mentioned copending application.

Ion exchange demineralizer 44 periodically is regenerated by back flushing with acid for the cation exchanger and with caustic for the anion exchanger. Acid is provided from tank 62 via a pump 64 and conduit 66; and caustic is provided from a tank 68 via a pump 70 and conduit 72. In some instances, air and well water also may be used to rinse the demineralizer beds. Moreover, demineralized water from tank 46 may be introduced via conduit 74 for such mechanical rinsing. The resultant acidic and caustic streams produced during regeneration of the demineralizer and the removed contaminants are directed to a stainless steel concentrated waste water sump 76 via a conduit 78. The water and solids removed by backflushing from conduit 74 preferably are passed via a further conduit 80 to a sump 82 which is periodically emptied into mixing tank 16 by means of pumps 84. A similar regeneration cycle is followed for ion exchange deionizer 52; however, for purposes of clarity on the drawing, the corresponding conduits have for the most part not been illustrated for deonizer 52.

Any excess concentrated waste water from sump 76 is directed via a conduit 86 to sump 82 for further recycling. The normal flow of liquid from sump 76 is to storage tank 88 from which it is then removed by pumps 90 to evaporator feed tanks 92, 94 which include appropriate agitators (not shown). Pumps 96, 98 direct the highly concentrated liquid to an evaporator 100 where the residual water is driven off and returned to demineralizer tank 46 via conduits 102. The solids remaining following evaporation are passed to a centrifuge 104 from which any remaining water is driven off and returned to evaporator feed tanks 92, 94. The resulting sludge is delivered to a silo 106 for eventual removal and disposition.

FIG. 2 shows a schematic of an industrial plant 10 having an existing network of drainage trenches for removing plant effluents from the plant for appropriate treatment. Longitudinal trenches 108–114 and lateral trenches 116–128 are interconnected to form a network of trenches which, before installation of the improvements according to the present invention, directed effluents to sumps 130–136 connected to discharge conduit 12. In a plant such as shown in FIG. 2, several types of manufacturing machinery or processing stations typically are in use. For example, Area A might include various types of metal working equipment for making components such as battery cases. Such equipment ordinarily produces effluents such as leakage from the metal working machines and oil used during various metal-working processes. Area B might include electro-mechanical cleaning equipment such as would be used for cleaning various types of battery components. Area C might include metal plating stations such as could be used for nickel plating battery components. Area D might include other types of electro-mechanical cleaning equipment. Prior to the enactment of various anti-pollution regulations now in force, the effluents from Areas A, B, C and D is such a plant most likely would have been allowed to flow indiscriminately into the trench network and, in some cases, to discharge directly to the environment and, in other cases, to a waste water treatment system such as that shown in FIG. 1. However, as previously indicated, when the various components of the industrial plant 10 are producing not only expected effluents having relatively low concentrations of impurities but also unanticipated leakage, spillage and other effluents having relatively high concentrations of impurities, then the combined effluents reaching the waste water treatment system may include such a high level of impurities that the waste water treatment system will not be totally effective.

To segregate the normal effluents from highly concentrated effluents, a plurality of dams are installed in the drainage trenches. First, dams 138-144 are installed to isolate the effluents from Area A. A conduit 146 extends from each of trenches 108-114 across the plant to a pump 148 which directs the small amount of machinery oils thus collected to the normal sanitary sewer. Second, the rather highly concentrated effluents from Area B are directed to trench 114 by installing dams 150-154. Third, the relatively low concentration effluents from Area C are directed to trench 108 by installing dams 156-164. Finally, the relatively high concentration effluents from Area D are directed to trench 114 by installing dams 156-176.

Normal or relatively clean effluents from Areas B and D which need not be treated as highly concentrated effluents are collected in a conduit 178, such as a polyvinylchloride pipe and conveyed to a header pipe 180 which preferably runs through trench 114, as shown in FIG. 3. So that the trench may be conveniently closed by a typical grate or walkway (not illustrated), conduit 180 preferably is passed directly through dam 176, via an appropriate seal, 177. Thus, highly concentrated effluents are trapped behind dam 176 and normal effluents flow on to sump 136. A pump 182 is provided for removing highly concentrated effluents from behind dam 176. A conductivity probe 184, low level probe 186, intermediate level probe 188 and high level probe 190 are provided to monitor the condition of the highly concentrated effluents behind dam 176. Pump 182 is operated intermittently in response to the level of the liquid behind the dam.

As shown in FIG. 4, the output of pump 182 flows through a conduit 192 to sump 76 shown in FIG. 1, where all abnormal, highly concentrated effluents are collected. Other plant systems which discharge relatively high concentration effluents also are illustrated in FIG. 4. For example, a waste caustic sump 194 is discharged to conduit 192 by means of a pump 196. Similarly, overflow caustic material from other sources may be collected in a disposal tub 198. A hinged lid 200 on tub 198 may be raised to permit plant operators to deposit miscellaneous liquid wastes.

Pumps 148, 182 and 196 are individually controlled in response to the liquid level in their associated trenches or sumps by means of controllers such as that shown schematically in FIG. 5. Low and intermediate probes 186, 188 are connected to a conventional control circuit 202 so that when the liquid level behind the dam is between the desired low and medium set points, an output signal is produced on line 204 which actuates one of solenoid valves 206, 208 to direct pressurized air to one of air driven pumps 196, 182. A similar controller is used for pump 148. A signal is also produced on line 210 to signal lamp 212 which indicates pump operation. Should the pump fail to run or fail to run properly, the level of highly concentrated effluents will continue to rise until high probe 190 is actuated. Probe 190 is connected to a conventional controller 214 which actuates an alarm to indicate pump malfunction. Finally, a recorder 216 preferably is included to provide a continuous record of the operation of the various pumps, the level of highly concentrated liquid behind the various dams and the conductivity of the effluent.

INDUSTRIAL APPLICABILITY

Although the invention was developed for use in a battery manufacturing facility, those skilled in the art will appreciate that the invention is also adapted for use in any industrial plant which produces large volumes of effluents having relatively low concentrations of impurities and rather small volumes of effluents having high concentrations of impurities.

Having discussed our invention in sufficient detail to enable those skilled in the art to make and use it,

We claim:

1. In an industrial plant of the type having first waste liquid effluents with impurities in anticipated relatively low ranges of concentration; second waste liquid effluents, caused at least in part by leakage or spillage in the plant, with impurities in significantly higher ranges of concentration; and a network of drainage trenches for removing said effluents from the plant, the improvement comprising:
   at least one liquid dam in said network for blocking flow of liquid through at least one of said trenches and thereby stopping the flow of said second liquid effluents from the plant;
   means for detecting intermediate and low levels of said second liquid effluents behind said at least one liquid dam;
   means responsive to said detecting means for pumping said second liquid effluents from behind said dam when the liquid level is between said intermediate and low liquid levels;
   means connected to said pumping means for concentrating the impurities in said second liquid effluents, for disposal;
   at least one conduit for receiving the flow of said first liquid effluents and directing it past said at least one liquid dam;
   means connected to said at least one conduit for removing the impurities in said first liquid effluents, whereby acceptably clean water is produced; and
   means for passing said acceptably clean water back to the plant for reuse.

2. The improvement according to claim 1, further comprising means for detecting high level of said second liquid effluents behind said dam; and means responsive to said high level detecting means for actuating an alarm to indicate malfunction of said pumping means.

3. The improvement according to claim 1, further comprising means for measuring and displaying the conductivity of said second liquid effluents whereby plant malfunctions may be detected.

4. The improvement according to claim 1, further comprising a receiver for miscellaneous high concentration waste liquid effluents and means for delivering the contents of said receiver to said concentrating means.

* * * * *